US005746398A

United States Patent [19]

Rollet et al.

[11] Patent Number: 5,746,398

[45] Date of Patent: May 5, 1998

[54] FORCE-GRADIENT CYCLIC STICK SYSTEM FOR A HELICOPTER

[75] Inventors: Philippe Alain Jean Rollet, Velaux; Jacques Serge Louis Bellera, Aix-en-Provence, both of France

[73] Assignee: Eurocopter France, Marignane Cedex, France

[21] Appl. No.: 577,130

[22] Filed: Dec. 22, 1995

[30] Foreign Application Priority Data

Dec. 22, 1994 [FR] France .................................. 94 15466

[51] Int. Cl.[6] ............................ B64C 13/06; B64C 13/46

[52] U.S. Cl. .......................... 244/223; 244/234; 244/236; 244/181

[58] Field of Search ................................ 244/76 R, 175, 244/180, 181, 194, 195, 196, 221, 223, 234, 236, 17.11, 17.13; 318/584, 585, 628

[56] References Cited

U.S. PATENT DOCUMENTS

| | | | |
|---|---|---|---|
| 2,695,145 | 11/1954 | Lear et al. | 318/628 X |
| 2,936,976 | 5/1960 | Greenland et al. | 244/223 |
| 4,607,201 | 8/1986 | Koenig | 244/181 X |
| 4,607,202 | 8/1986 | Koenig | 318/628 |
| 4,664,346 | 5/1987 | Koenig | 318/628 X |
| 5,489,830 | 2/1996 | Fernandez | 318/628 |

FOREIGN PATENT DOCUMENTS

| | | |
|---|---|---|
| 0160834 | 11/1985 | European Pat. Off. . |
| 2095867 | 10/1982 | United Kingdom . |
| 2140174 | 11/1984 | United Kingdom . |

*Primary Examiner*—William Grant
*Attorney, Agent, or Firm*—Watson Cole Stevens Davis, P.L.L.C.

[57] ABSTRACT

A cyclic stick system for a helicopter includes sensors for measuring at least one parameter representative of the current flight status of the helicopter. In response to the at least one parameter, the cyclic stick system either (1) continuously and automatically recenters the forces on the cyclic stick, thus canceling out the residual static forces, or (2) allows the pilot fully to feel the countering action of the elastic return device on the cyclic stick.

14 Claims, 2 Drawing Sheets

FORCE-GRADIENT CYCLIC STICK SYSTEM FOR A HELICOPTER

FIELD OF THE INVENTION

The present invention relates to a cyclic stick system for a helicopter, allowing a pilot to feel different command forces, according to the flight conditions and the degree of aggressiveness of the maneuvers around the roll and pitch axes. It applies whatever the embodiment of the cyclic stick proper, and particularly to ministicks associated with electrical flight controls.

DESCRIPTION OF RELATED ART

It is known that, on a helicopter, the static position of the flight controls controlling the roll and the pitch changes as a function of the flight conditions. If these controls incorporate a spring generating a force gradient, the pilot is made to recenter the forces felt at the stick by acting on the force recentering devices (generally called "trim release" in aeronautics), every time these flight conditions (forward speed, motive power applied) change. Such a recentering cancels out the static control forces which are prejudicial to the pilot's comfort and to the accuracy of the piloting.

However, the frequent need for recentering of forces at the cyclic stick generates a significant workload which certain pilots find troublesome. Thus, in order to reduce this workload, devices have already been proposed tending to cancel out the forces automatically after a certain time. These are essentially:

- follower recentering devices which, with a certain dynamic range, slave the position of anchorage of the spring (zero-force reference) to the current position of the stick. Such devices are provided particularly on helicopters which have to undertake tactical flights close to the ground ("NOE" flight, that is to say Nap Of the Earth Flight or Tactical Flight), for which the speed and the power constantly change;
- integral recentering devices, which inject in series into the demand an order proportional to the timewise integral of the direct order from the stick. The pilot is then naturally encouraged to bring back the cyclic stick to the neutral of the forces in proportion as the order injected by the integrator rejoins the value initially demanded by the direct stick order. This type of recentering makes it possible to use a stick (or ministick) with a fixed anchor point, without recentering motors.

All these known systems jointly exhibit the drawback of cancelling out the forces solely as a function of time-based parameters, and thus of suppressing any tactile sensation at the stick during maneuvers of large amplitude or upon approaching the control stops. In particular, the follower recentering systems cause the change in forces as a function of the vertical load factor ("g" forces) to disappear, although this change produces a tactile sensation facilitating piloting of the load factor in a maneuver, a sensation which is, moreover, required by military flying characteristics standards.

SUMMARY OF THE INVENTION

Consequently, the principal subject of the present invention is a cyclic stick system which handles the artificial forces at the stick (or ministick) in roll and/or in pitch, which automatically cancels out the static forces when the flight conditions are stabilized, and which keeps the transient forces during maneuvers, thus giving the pilot a feedback of tactile information facilitating gauging of the actions on the stick.

The present invention makes it possible not only to keep forces on the cyclic stick (or ministick) during the execution of the maneuver, but also to make these forces vary artificially as a function of parameters external to the fitment of the stick, for example the degree of aggressiveness of the maneuvers performed around roll and pitch axes (measurement of load factor or of angular speeds).

Likewise, it can incorporate a device for managing the artificial forces at the stick (or ministick) controlling the roll and the pitch, allowing the pilot to feel, in a tactile way, the approach of the control stops on these two axes.

The present invention can if appropriate be coupled with an automatic hold device, for example attitude hold. The logic for updating the attitude reference depends on operational choices defined by the pilots. One possible example is updating of the reference attitude systematically upon passing to "nonpiloted" mode, which has the effect of keeping the current attitude, as soon as the forces have been cancelled out.

To this end, according to the invention, the cyclic stick system for a helicopter including means continuously delivering parameters representative of the current flight status of said helicopter, said system including a cyclic stick which can be displaced, by a pilot, in two different directions corresponding respectively to the piloting in pitch and to the piloting in roll of said helicopter, is noteworthy in that it includes, for at least one direction of displacement of said cyclic stick for which elastic return means of said cyclic stick are provided in order to exert an action counter to that exerted by said pilot on said cyclic stick in said direction:

- a motor capable of displacing a movable member to which said elastic return means are attached, at an attachment point;
- means for delivering the difference between a first electrical signal representative of the positions of said cyclic stick in said direction and a second electrical signal representative of the positions of said attachment point;
- a link for addressing said difference to said motor; and
- a first controllable switch interposed in said link and controlled from at least one of said means delivering said parameters representative of the flight status, in such a way that:
  - in its closed position, said first switch provides the continuity of said link, when said parameter is below a reference threshold, so that said motor is then supplied with said difference between said first and second electrical signals and so that the displacement of said movable member by said motor tends to cancel out said countering action of said elastic return means;
  - in its open position, said first switch cuts said link, when said parameter is above said reference threshold, so that then said motor is not supplied and so that the countering action of said elastic return means is exerted totally on said cyclic stick displaced in said direction.

Thus, the system deriving the control orders in pitch and/or in roll, resulting from the displacement or displacements of said cyclic stick and addressed to the rotor or rotors, also generates orders for displacing the neutral of the forces (attachment or anchor point), these orders being derived by the system as a function of various flight parameters, in such a way that the neutral of the forces on the pitch axis or the roll axis is centered on the current position of the stick or ministick whenever said first switch is in the closed position and provides the link between the input and the output.

In the closed position of said first switch, said cyclic stick system benefits from continual automatic recentering of the forces, which cancels out the residual static forces. In contrast, in the open position of said first switch, the pilot fully feels the countering action of said elastic return means, which allows him better to gauge his action on the cyclic stick.

Thus the pilot feels control forces which are variable according to the flight conditions.

The said difference representative of the offset between the position of the cyclic stick and the anchor position can be obtained in several different ways. For example, it could be calculated in the automatic pilot or in the fly-by-wire system (if they exist). In this case, said means for delivering said difference would just be means for transmitting said difference between the site of its calculation and said cyclic stick system. In a variant, said difference can be derived directly in said cyclic stick system. To this end, said cyclic stick system may additionally include:

- at least one first position sensor, associated with said cyclic stick and generating said first electrical signal representative of the positions of said cyclic stick in said direction;
- at least one second position sensor, associated with said attachment point and generating said second electrical signal representative of the positions of said attachment point; and
- a subtractor for forming the difference between said first and second electrical signals; while said link links the output of said subtractor and said motor.

Obviously, such a subtractor may be formed not by a specific discrete device, but may consist of a part of a more complex calculation system.

For preference, in said link, adjustment means are additionally available, such as a variable-gain amplifier, making it possible, in closed position of said first switch, to adjust the tactile sensation felt by the pilot actuating said cyclic stick in said direction.

In one particularly simple example embodiment of the cyclic stick system in accordance with the present invention, use is made, as parameters representative of the status of said helicopter, of the angular speed of said helicopter about the piloting axis corresponding to said direction of displacement of said cyclic stick. In this case, said system includes first comparison means making it possible continuously to compare said angular speed with a corresponding reference threshold, said first comparison means controlling said first controlled switch, in such a way that the latter is, respectively, in closed position if said angular speed is below said reference threshold and in open position if said angular speed is above said reference threshold.

For preference, said parameters representative of the status of said helicopter additionally comprise the air speed of said helicopter, and the system of the invention includes a generator for generating said reference threshold as a function of said air speed. Such a function can be such that said reference threshold is inversely proportional to the air speed or alternatively such that said reference threshold is constant at low speed of said helicopter and is inversely proportional to said air speed for high speeds of said helicopter.

Advantageously, the cyclic stick system in accordance with the present invention additionally includes:

- second comparison means making it possible continuously to compare said second electrical signal representative of the positions of said attachment point with at least one reference threshold representative of at least one nearby position of an end stop of said cyclic stick; and
- a second controllable switch interposed on said link, downstream of said first switch, and driven open by said second comparison means in the case in which the value of said second electrical signal exceeds said reference threshold.

Thus, for the pilot, the tactile approach of the end-of-travel stops of the cyclic stick is reconstituted, since, on the opening of said second switch, the automatic motor drive to the cyclic stick is frozen and the pilot actuates said cyclic stick counter to the action of said elastic return means. The appearance of the piloting force combined with the position of the arm warns the pilot of the approach of the stop before it is reached. When the position of the attachment point (anchor point) enters a region close to end stops which is denoted by said threshold or thresholds, for example at 10% from the stop, the automatic recentering function is frozen by cancellation of the datum value sent to the motor. The function of automatic control of the recentering therefore intervenes only over a reduced range of the total travel of the cyclic stick.

Hence it is seen that the recentering of the forces on the axis (roll or pitch) concerned is active whenever the angular speed on this axis remains below a certain threshold which can itself possibly be variable as a function of other parameters, such as the air speed, and that the orders sent to the rotor or rotors do not lead to too close an approach to the control stops on this axis.

With gentle and progressive maneuvers, when the angular speed remains below the fixed threshold and when the axis control is not too close to the stops, the system operates in follower mode and the force on the stick (or ministick) on the axis involved with the maneuver is continuously cancelled out, by means of a certain time constant dependent on the dynamic range of the slaving.

With rapid and high-amplitude maneuvers, or when the axis control is approaching the stops, the system maintains the anchor point and the pilot feels the return force on the stick on the axis concerned with the maneuver, resulting in a tactile sensation facilitating the gauging of the control order. When the pilot restabilizes the helicopter at the end of the maneuver, the angular speed is caused to fall below the threshold, giving automatic recentering of the force on the axis concerned, except when close to the stops. In this case, only deliberate action by the pilot on the manual recentering device can displace the anchor point of the stick towards the stop.

From what has just been described, it will easily be understood that the cyclic stick system in accordance with the invention can be associated with mechanical control rods in order to control the helicopter in pitch and/or in roll. However, it is most particularly appropriate for being used in association with a fly-by-wire system. In this latter case, at least a part of said cyclic stick system (with the exception of the cyclic stick itself) can be integrated into said fly-by-wire system.

In the case in which said fly-by-wire system includes an automatic pilot device intended to provide automatic hold for said helicopter about the piloting axis corresponding to said direction of displacement of said cyclic stick, such as attitude hold, it is advantageous additionally to provide:

- a detector of the status of human piloting or of the status of automatic piloting of said helicopter about said piloting axis; and a two-channel router interposed on said link, down-stream of said first switch, and controlled by said detector, either to provide the continuity of said link, or to link said automatic pilot device to said motor.

Thus, the cyclic stick system in accordance with the present invention is fully compatible with automatic piloting modes of the attitude hold type, which require motor drive of the cyclic stick for recentering of the control members when the pilot is not active.

The cyclic stick system according to the invention is thus capable of allowing the following two operating modes,

- the piloted mode, in which the pilot acts on the cyclic stick,- the automatic hold functions then being inhibited and the function of automatic recentering of the forces on the cyclic stick being active;
- the automatic mode, in which the pilot does not act on the cyclic stick, the automatic hold functions being active and driving the cyclic stick to recenter the control members (series jack of the automatic pilot, for example), while the function of automatic recentering of the forces on the cyclic stick is inactive.

Said detector, intended to detect the current piloting state (human or automatic), may be of different types. For example, it could consist of a force sensor directly measuring the force exerted by the pilot's hand on the cyclic stick. However, in one advantageous embodiment, there is provision for detection of the current piloting state to be based on the measurement of the offset between the position of the cyclic stick and the current anchor position of said elastic return means of said cyclic stick.

In this case, said detector may be formed by third comparison means making it possible continuously to compare, with a reference threshold, said difference between said first and second electrical signals, said third comparison means controlling said router so that the latter provides, on the one hand, the continuity of said link when said difference is above said reference threshold and, on the other hand, the connection of said automatic pilot device to said motor when said difference is below said reference threshold.

It will be noted that the cyclic stick system in accordance with the present invention can operate for the direction of displacement of said cyclic stick corresponding to pitch or for that corresponding to roll, or even for each of these two directions on condition that two systems of the type described above are provided. In this latter case, certain elements of the two cyclic stick systems may possibly be combined.

BRIEF DESCRIPTION OF THE DRAWINGS

The figures of the attached drawing will give a good understanding of how the invention can be produced. In these figures, identical references designate similar elements.

DETAILED DESCRIPTION OF THE PREFERRED EMBODIMENT

Thus, the invention described with regard to these figures incorporates the particular constraints relating to the pitch axis. It cancels out the forces when the vertical load factor generated by the maneuver (pull-up, turn) is low, and keeps them as soon as the vertical load factor exceeds a certain threshold, thus making it possible to satisfy the requirements of the military flying characteristics standards for "g" forces (forces to be pulled or pushed which are representative of the vertical load factor).

Figure 1:
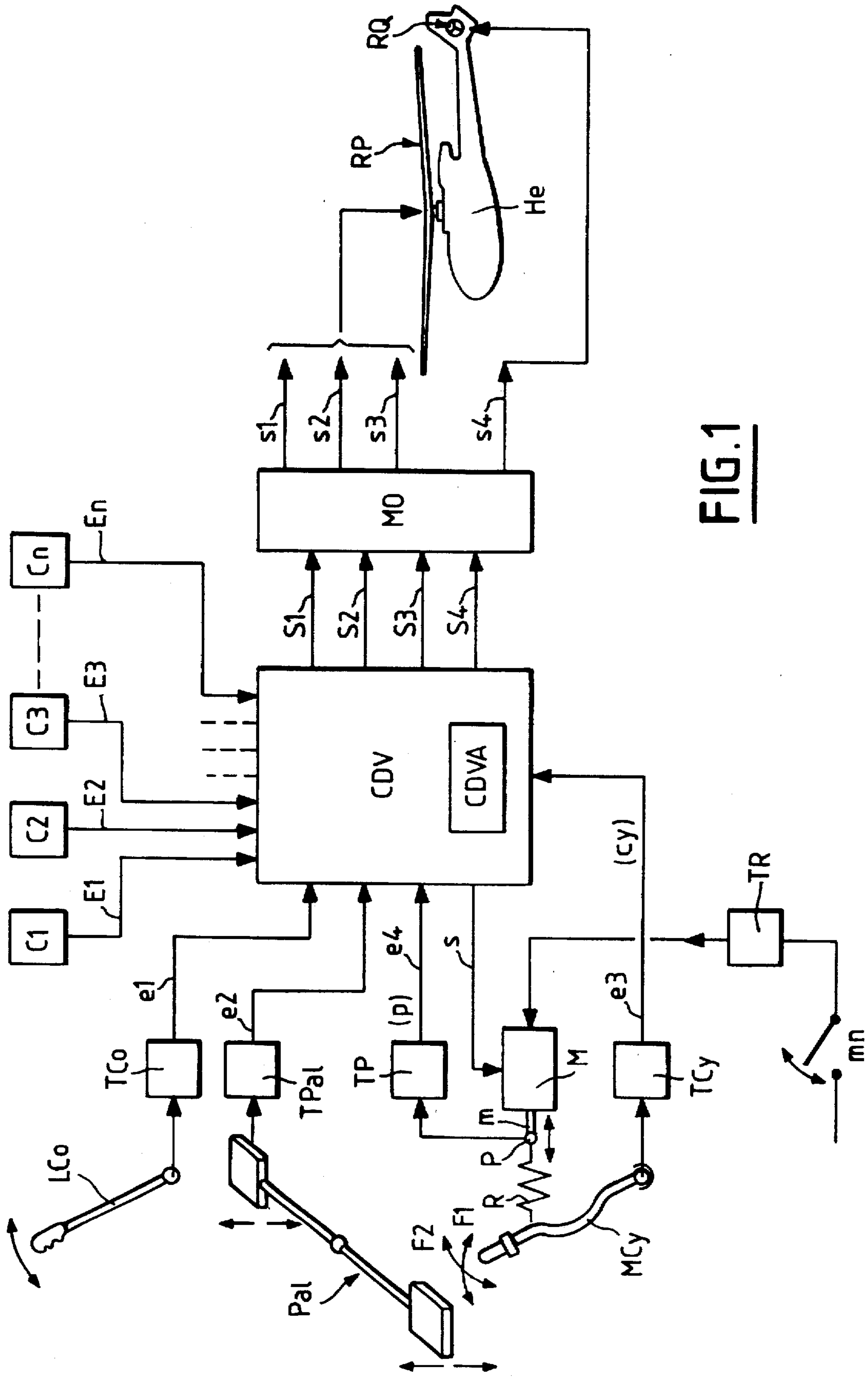
FIG. 1 shows the block diagram of an example embodiment for a flight control system for a helicopter, incorporating a cyclic stick system in accordance with the present invention, provided for piloting in pitch F1 and in roll F2.
Figure 2:
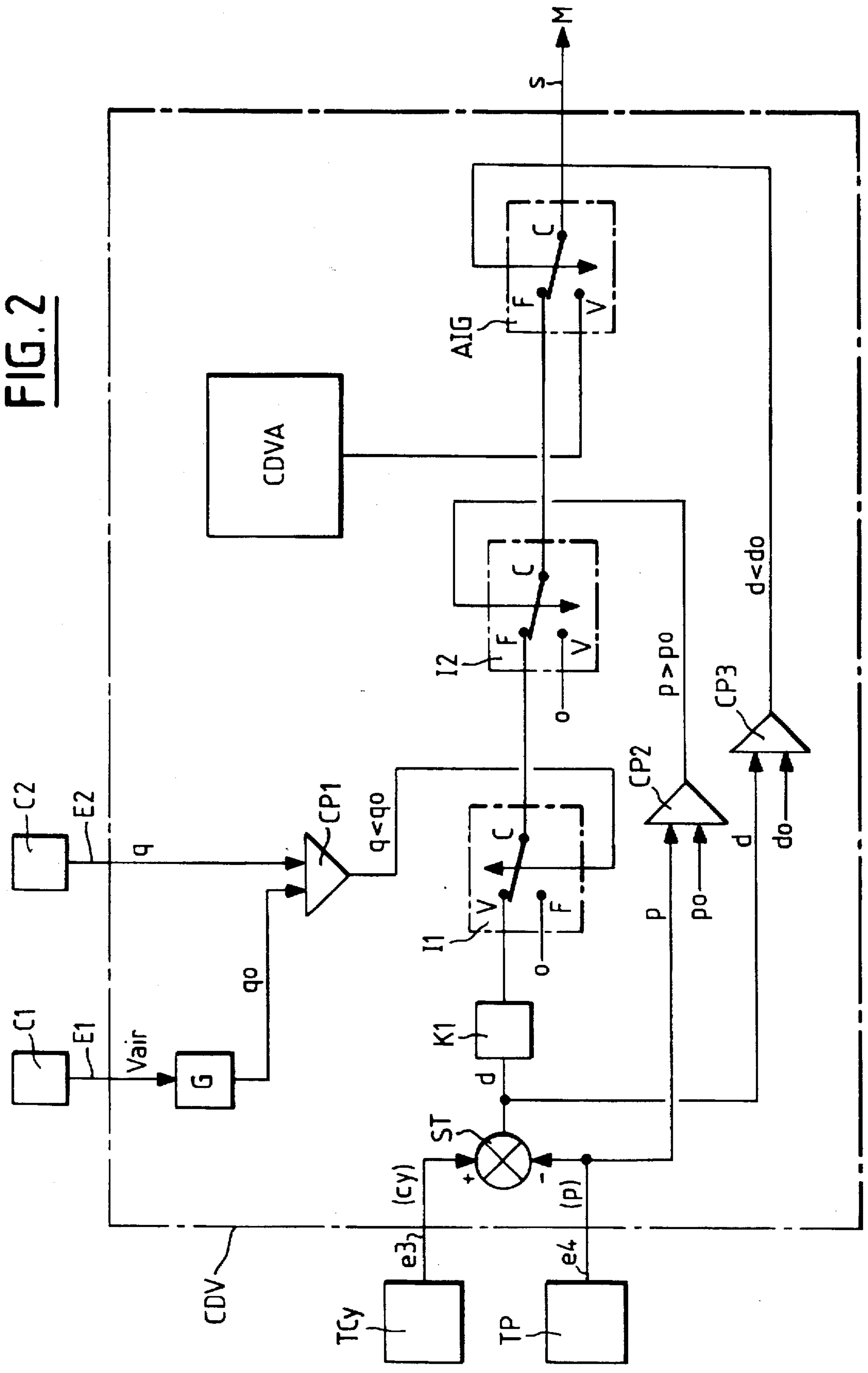
FIG. 2 is the block diagram of an example embodiment of the cyclic stick system in accordance with the present invention, intended for piloting in pitch.

The devices represented diagrammatically by FIGS. 1 and 2 are, obviously, mounted on board a helicopter He to be piloted, although, for reasons of clarity of the drawing, the helicopter He is represented on a small scale, externally to said system, in FIG. 1. The helicopter He includes at least one main rotor RP intended to provide lift, forward motion and control in pitch and in roll, as well as tail rotor RQ or any other device (for example the Notar system from the American constructor Mc Donnell Douglas), intended to ensure lateral equilibrium and, if appropriate, yaw control of the helicopter He.

The example embodiment of a flight control system for a helicopter, shown diagrammatically in FIG. 1, includes a fly-by-wire device CDV receiving a plurality of information items and sending out control orders. To this end, in the example represented, the following are associated with the device CDV:

- the collective pitch lever LCo, associated with a transducer TCo, converting the displacements of said lever into an electrical signal addressed to the device CDV via a link e1;
- the rudder bar Pal, associated with a position sensor TPal converting the positions of said rudder bar into an electrical signal, addressed to the device CDV via a link e2;
- the cyclic pitch stick MCy, associated with a transducer TCy converting the positions of said stick in pitch into an electrical signal cy, addressed to the device CDV by a link e3. Obviously, in a known way, the cyclic pitch stick can be displaced, on the one hand, from front to back and from back to front for piloting in pitch (double arrow F1) and, on the other hand, from left to right and from right to left for piloting in roll (double arrow F2). However, in FIGS. 1 and 2, only the piloting in pitch (arrow F1) is considered. Moreover, although represented in the form of a large stick, it goes without saying that the cyclic stick MCy can take the form of a ministick; the device for motor drive of the cyclic stick MCy for control in pitch, including at least one electric motor M (for example of the jack type) acting on a movable member m linked to said cyclic stick MCy by a return spring R, opposing the action of the pilot on said cyclic stick;
- a position sensor TP, converting the positions of the point P, to which the return spring R is attached (or anchored) on the movable member m into an electrical signal p, addressed to the device CDV via a link e4;
- a plurality of n sensors C1 to Cn, mounted on board the helicopter and delivering a plurality of information items, in the form of electrical signals, on the statuses of said helicopter, such as air speed, angular speed, angular accelerations, attitudes, load factors etc., said information items being addressed to the device CDV via links E1 to En;
- an order mixer MO receiving, via the links S1 to S4, the control orders derived by the device CDV from the signals addressed via the links e1 to e4 and E1 to En, and addressing control orders via the links s1 to s3, to the servo controls of the main rotor RP and, via the link s4, to the servo control of the tail rotor RQ;

a link s by which the device CDV addresses, to the motor M of the cyclic stick MCy, orders for displacements of the movable member m and thus of-the attachment or anchor point P; and a device TR for recentering of the forces on the cyclic stick MCy, controlled by a handle mn available to the pilot.

In FIG. 2, a simple example embodiment of the cyclic stick system in accordance with the present invention has been represented, consisting partly of the flight control device CDV. In FIG. 2, only the links serving for the motor drive of the cyclic stick MCy in pitch have been represented. This embodiment, in accordance with the present invention, involves:

the sensor of pitch position TCy of the cyclic stick MCy, generating the electrical signal cy on the link e3, said signal cy being representative of the positions of the cyclic stick in pitch;

the position sensor TP, generating the electrical signal p on the link e4, said signal p being representative of the positions of the attachment point P;

the sensor C1, generating, on the link E1, an electrical signal Vair representative of the speed of the helicopter with respect to the air; and the sensor C2, generating on the link E2 an electrical signal g representative of the pitch angular speed of the helicopter.

Moreover, the relevant part of said flight control device CDV includes:

a subtractor ST, linked to the links e3 and e4 and delivering the signal d at its output, representative of the difference cy-p;

a first comparator CP1, receiving the signal a generated by the sensor C2 and comparing it with a reference value qo;

a second comparator CP2, receiving the signal p generated by the position sensor TP and comparing it with a reference value po;

a third comparator CP3, receiving the signal d generated by the subtractor ST and comparing it with a reference value do;

an automatic pilot device CDVA performing the functions of automatic hold for the helicopter He in pitch, such as the automatic attitude hold;

a first controllable switch I1 controlled by said first comparator CP1, and the working input V of which is linked to the output of the subtractor ST, by way, for example, of a variable-gain amplifier K1, so as to receive the signal d. The rest input F of the switch I1 is at the 0 potential;

a second controllable switch I2 controlled by said second comparator CP2 and the rest input F of which is linked to the common output C of said first switch I1, by way, for example, of a variable-gain amplifier K1. The working input V of the switch I2 is at the 0 potential; and a two-channel router AIG controlled by said third comparator CP3 and the rest input F and the working input V of which are linked respectively to the common output C of said second switch 12 and to the output of the automatic pilot device CDVA.

In the device of FIG. 2:

the first switch I1 is driven into working position—for which said subtractor ST is linked to second switch I2—when the first comparator CP1 receives a signal g below the reference go;

the second switch I2 is driven into working position—for which the output s of the device CDV is isolated from the common output C of the first switch I1—when the signal p is above the reference po; and the router AIG is driven by the third comparator CP3 into working position—for which the output of the device CDVA is linked to the output s—when the signal d is below the reference do.

The threshold qo could be constant, as are the threshold po and do. However, as is represented in FIG. 2, it is preferable for the threshold qo to be generated by a generator G, from the continuous measurement of the speed Vair of the helicopter, delivered by said sensor C1 on the output E1. Hence, the threshold qo may vary inversely proportionally to the air speed Vair, which amounts to putting a threshold on the vertical load factor. For preference, the generator G generates a function qo which is constant (equal, for example, to 3°/s) at low helicopter speed (for example between 0 and 40 Kts), then which, beyond a speed threshold (40 Kts in the example above), varies inversely proportionally to Vair. Clearly, the threshold qo could vary as a function of the speed Vair according to other laws generated by the generator G.

Thus, when the maneuvers by the helicopter He are gentle and progressive and when the pitch angular speed g remains below the threshold go, the difference d is sent to the motor M through the switches I1, 12 and the router AIG. Consequently, the motor M, supplied with the difference d, continuously cancels out the force in pitch by shifting the point P on the cyclic stick MCy, by means of a certain time constant dependent on the dynamic range of the system.

In the case of rapid and high-amplitude maneuvers by the helicopter He, when the pitch angular speed g exceeds the threshold go, the first switch I1 opens under the control of the first comparator CP1, interrupting the link between the subtractor ST and the motor M. The system thus no longer acts on the position of the anchor point P and the pilot feels the return force exerted on the cyclic stick MCy, by the spring R. This results, for the pilot, in a tactile sensation during the maneuver, which facilitates gauging of the control order in pitch. When the pilot restabilizes the attitude at the end of the maneuver, the pitch angular speed g reduces and passes back below the threshold qo so that the switch I1 toggles back so as again to provide continuity of the link between the subtractor ST and the motor M, the latter then performing automatic recentering of the force exerted, in pitch, by the spring R on the stick MCy.

In a stabilized turn, a stabilized pitch rate appears, which is a function of the load factor and thus of the inclination. For moderate inclinations, (for example less than 30°), and thus low load factors, the pitch rate corresponds to an angular speed g below the threshold and the forces are continuously centered. For high inclinations, and thus high load factors and high angular speeds a, the anchor point P remains fixed and the pilot has to exert a certain amount of force on the stick in order to maintain the load factor, which facilitates gauging thereof.

In a similar way, when the pilot performs gentle, positive or negative recoveries in the vertical plane, the system cancels out the force on the stick. For recoveries with greater variations in load factor, the anchor point P remains fixed and the pilot has to exert a force on the stick, pulling or pushing, in order to maintain the load factor.

In order to explain the bidirectional change between the mode of piloting in pitch with the stick (human piloting) and the mode of piloting in pitch in automatic hold (piloting by the device CDVA), it is assumed, in the explanation below, that the position is initially stabilized, with the automatic hold functions activated, that is to say that the router AIG is in working position and links the device CDVA to the motor M.

If the pilot wishes to change flight conditions, for example in order to perform a change of attitude, he exerts a force on the stick MCy, so that it generates a position offset between said stick and the point P of anchorage of the return spring R on the movable member m. The difference d thus increases. As soon as the difference d becomes equal to or greater than the reference do, the comparator CP3 drives the router AIG so that it passes into rest position and links the first switch I1 to the motor M. The automatic hold functions (exercised by the device CDVA) are thus then inhibited.

The rapid change from one attitude to another entails a significant variation in the pitch angular speed g, which remains greater than the threshold go. Consequently, as was explained above, the first switch I1 cuts the link with the output s. The pilot thus acts against the forces applied on the stick MCy by the return spring R.

However, on approaching the new desired attitude, the pilot, in order to restabilize the helicopter, causes the angular speed g to fall. As soon as the latter becomes lower, while decreasing, than the reference go, the first switch I1 passes back to working position and the motor M is again supplied with the difference d, so that the return force of the spring R is automatically recentered.

If the static position of the cyclic stick MCy has changed between the two flight conditions, the attachment point P regains the new position of the stick, which is conveyed, for the pilot, by the sensation of automatic reduction of the forces.

As soon as the position of the attachment point P has rejoined the current position of the cyclic stick, the difference d again becomes less than the reference do, so that the comparator CP3 drives the router AIG so that it passes to its working position, linking the device CDVA to the motor M.

The functions of automatic hold in pitch are thus active again.

Moreover, it will be noted that, by virtue of the second comparator CP2 and of the second switch I2, the pilot is warned of the approach of an end stop of the stick MCy. In fact, as soon as said second electrical signal p reaches the reference value po, the second switch I2 is driven open. Consequently, the supply to the motor M is cut off and the pilot feels the increasing effort which he is exerting on the cyclic stick counter to the action of the return spring R. The pilot is thus alerted in a tactile way to the approach of the end stop of the cyclic stick, and is so alerted all the more as he simultaneously perceives his control margin by the absolute position of his hand and the extension of his arm.

It will be noted moreover that the function of the second comparator CP2 can be performed in different ways, especially having regard to the fact that said cyclic stick has two end stops in pitch, which would therefore require two reference values po.

In FIG. 2, it has been assumed that the second comparator CP2 compared the absolute value of the signal p with a reference po, that is to say that the margin of detection of the two end stops was the same.

For example, if it is assumed that the cyclic stick has a range of travel, on either side of a neutral position, of respectively +50% and −50%, po can be taken to be equal to 40%, so that the second switch I2 will be open whenever the cyclic stick approaches within 10% of each of said end stops.

Clearly, instead of providing only one reference value po as above, and of comparing it with the absolute value of the signal p, it would be equally valid to define two reference values po1 and po2, each associated with one end stop of the cyclic stick MCy, and to compare said signal p (and no longer its absolute value) with said reference values po1 and po2.

In the example embodiment of the cyclic stick system in accordance with the present invention and illustrated by FIGS. 1 and 2, only the pitch axis (double arrow F1) has been considered. It is quite obvious that the present invention can also be applied to the roll axis (double arrow F2), provided that the return spring R and the motor M exert their action in roll and that the transducer TCy supplies a signal representative of the displacements of the cyclic stick MCy in roll. In this second case, it would be necessary to take into account the roll angular speed, instead of the pitch angular speed g, and for the threshold po to be representative of the approach of the end stops of the stick MCy in roll (double arrow F2).

It is also quite obvious that the present invention can apply equally, both as regards pitch and as regards roll, for the same cyclic stick MCy.

We claim:

1. A cyclic stick system for a helicopter, the helicopter including condition sensing means for continuously sensing a current flight status of the helicopter and delivering parameters representative of the current flight status of said helicopter, said cyclic stick system comprising:

- a cyclic stick for displacement by a pilot in two different directions corresponding respectively to piloting of the helicopter in pitch and to piloting of the helicopter in roll;
- elastic return means for exerting, in at least one of the two different directions, a countering action counter to the displacement by said pilot on said cyclic stick in said at least one of the two different directions;
- a movable member to which the elastic return means is attached at an attachment point;
- a motor for displacing the movable member to which said elastic return means is attached;
- difference delivering means for (i) sensing a position of the cyclic stick in said at least one of the two directions to output a first electrical signal representing the position of the cyclic stick in said at least one of the two directions, (ii) sensing a position of the attachment point to output a second electrical signal representing the position of the attachment point and (iii) delivering a difference between the first electrical signal and the second electrical signal;
- link means for addressing said difference to said motor to control said motor to displace the movable member to cancel out the countering action of the elastic return means; and
- a first controllable switch, interposed in said link one of said means (Cl to Cn) delivering said parameters representative of the flight status, in such a way that:
  - in its closed position, said first switch (11) provides the continuity of said link, when said parameter is below a reference threshold (qo), so that said motor (M) is then supplied with said difference (d) between said first and second electrical signals and so that the displacement of said movable member (m) by said motor (M) tends to cancel out said countering action of said elastic return means (R);
  - in its open position, said first switch (11) cuts said link, when said parameter is above said reference threshold, so that then said motor (M) is not supplied and so that the countering action of said elastic return means (R) is exerted totally on said cyclic stick displaced in said direction and receiving at least one of the parameters, for selectively opening and closing in accordance with the at least one of the parameters so as selectively (i) to allow the link means to address the difference to the motor when the first controllable switch is closed or (ii) to prevent the link means from addressing the difference to the motor when the first controllable switch is open.

2. The cyclic stick system as claimed in claim 1, wherein the difference delivering means comprises:

at least one first position sensor, associated with said cyclic stick, for sensing the position of the cyclic stick and generating said first electrical signal representative of the position of said cyclic stick;

at least one second position sensor, associated with said attachment point, for sensing the position of the attachment point and generating said second electrical signal representative of the position of said attachment point; and a subtractor for forming the difference between said first and second electrical signals; and wherein said link means comprises means for outputting the difference formed by said subtractor to said motor.

3. The cyclic stick system as claimed in claim 1, wherein the link means comprises adjustment means for adjusting a tactile sensation felt by the pilot actuating said cyclic stick in said at least one of the two different directions.

4. The cyclic stick system as claimed in claim 1, wherein:

said parameters representative of the current flight status of said helicopter comprise at least an angular speed of said helicopter about a piloting axis corresponding to said at least one of the two directions of displacement of said cyclic stick; and the cyclic stick system further comprises first comparison means for continuously comparing said angular speed with a corresponding reference threshold angular speed and for controlling said first controlled switch (i) to close when said angular speed is below said reference threshold angular speed and (ii) to open when said angular speed is above said reference threshold angular speed.

5. The cyclic stick system as claimed in claim 4, wherein:

said parameters representative of the current flight status of said helicopter further comprise an air speed of said helicopter; and the cyclic stick system further comprises a generator for generating said reference threshold angular speed as a function of said air speed.

6. The cyclic stick system as claimed in claim 5, wherein said reference threshold angular speed is inversely proportional to the air speed.

7. The cyclic stick system as claimed in claim 5, wherein said reference threshold angular speed is constant at speeds of the helicopter which are lower than a first speed of said helicopter and is inversely proportional to said air speed for speeds of said helicopter which are higher than the first speed.

8. The cyclic stick system as claimed in claim 1, further comprising:

second comparison means for continuously comparing said second electrical signal with at least one reference threshold electrical signal representative of at least one position of an end stop of travel of said cyclic stick; and a second controllable switch interposed between said first controllable switch and the motor and controlled to be open by said second comparison means when said second electrical signal exceeds said reference threshold electrical signal.

9. The cyclic stick system as claimed in claim 1, wherein:

the helicopter comprises fly-by-wire means for controlling a flight of the helicopter: and said cyclic stick system is at least partly integrated into said fly-by-wire means.

10. The cyclic stick system as claimed in claim 9, wherein:

said fly-by-wire means comprises automatic pilot means for providing automatic hold for said helicopter about a piloting axis corresponding to said at least one of the two directions of displacement of said cyclic stick; and the cyclic stick system further comprises:

a detector for determining whether said helicopter is being piloted about said piloting axis by the pilot or by the automatic pilot means; and a two-channel router interposed between said first controllable switch and the motor and controlled by said detector (i) to provide a continuity of said link means when the pilot is piloting the helicopter about the piloting axis or (ii) to link said automatic pilot means to said motor such that said automatic pilot means controls said motor when the automatic pilot means is piloting the helicopter about the piloting axis.

11. The cyclic stick system as claimed in claim 10, wherein:

said detector comprises third comparison means for continuously comparing said difference with a reference threshold difference, said third comparison means controlling said router such that the router provides (i) the continuity of said link means when said difference is above said reference threshold difference and (ii) connection of said automatic pilot means to said motor when said difference is below said reference threshold difference.

12. The cyclic stick system as claimed in claim 1, wherein the two different directions comprise a direction of displacement of said cyclic stick corresponding to piloting in pitch.

13. The cyclic stick system as claimed in claim 1, wherein the two different directions comprise a direction of displacement of said cyclic stick corresponding to piloting in roll.

14. The cyclic stick as claimed in claim 1, wherein the first controllable switch comprises:

means for comparing the at least one of the parameters to a reference threshold; and means for (i) closing the first controllable switch when the at least one of the parameters is below the reference threshold and (ii) opening the first controllable switch when the at least one of the parameters is above the reference threshold.

* * * * *